United States Patent
Weber

(10) Patent No.: US 12,396,434 B2
(45) Date of Patent: Aug. 26, 2025

(54) COLLAPSIBLE LITTER BOX

(71) Applicant: Lori Weber, Land O Lakes, FL (US)

(72) Inventor: Lori Weber, Land O Lakes, FL (US)

(*) Notice: Subject to any disclaimer, the term of this patent is extended or adjusted under 35 U.S.C. 154(b) by 0 days.

(21) Appl. No.: 18/620,938

(22) Filed: Mar. 28, 2024

(65) Prior Publication Data
US 2024/0260536 A1 Aug. 8, 2024

Related U.S. Application Data

(60) Provisional application No. 63/443,826, filed on Feb. 7, 2023.

(51) Int. Cl.
*A01K 1/01* (2006.01)

(52) U.S. Cl.
CPC .................................. *A01K 1/0125* (2013.01)

(58) Field of Classification Search
CPC .......................... B65D 11/1833; A01K 1/0125
USPC ........................................................ 220/666
See application file for complete search history.

(56) References Cited

U.S. PATENT DOCUMENTS

| | | | | |
|---|---|---|---|---|
| 1,301,650 A | * | 4/1919 | Chapman | B65D 11/1833 220/7 |
| 4,800,842 A | * | 1/1989 | Jones, Jr. | A01K 1/0125 119/168 |
| 5,014,649 A | * | 5/1991 | Taft | A01K 1/0125 119/168 |
| 6,315,151 B1 | * | 11/2001 | Hupp | B65D 21/086 220/666 |
| 6,487,990 B1 | * | 12/2002 | McNew | A01K 1/0125 119/168 |
| 8,596,448 B2 | * | 12/2013 | Sempe | A45C 7/0036 220/666 |
| 2004/0244708 A1 | * | 12/2004 | Neil | A01K 1/0125 119/168 |
| 2009/0261111 A1 | * | 10/2009 | Hsu | B65D 81/3818 220/666 |
| 2010/0065558 A1 | * | 3/2010 | Cavalcante | B65D 11/1833 220/4.28 |
| 2011/0062167 A1 | * | 3/2011 | Colton | B65D 19/18 220/666 |

* cited by examiner

*Primary Examiner* — Christopher D Hutchens
(74) *Attorney, Agent, or Firm* — Justin Luby

(57) ABSTRACT

A litter box that is portable and collapsible providing ease of traveling with the litter box. The litter box includes a bottom tray and a top enclosure. The bottom tray is a hollow rectangle with a bottom and the top enclosure has two collapsible walls and a roof that covers the bottom tray when in the collapsed position. The litter box top enclosure is erected for the use of the litter box and the top enclosure can be collapsed for travel.

2 Claims, 4 Drawing Sheets

COLLAPSIBLE LITTER BOX

CROSS-REFERENCE TO RELATED APPLICATIONS

This application claims priority to provisional application U.S. Ser. No. 63/443,826 filed Feb. 7, 2023.

FIELD OF THE DISCLOSURE

This disclosure relates to an animal litter box, and more specifically to an enclosed, portable, and collapsible animal litter box.

BACKGROUND

Domesticated animals, such as cats and dogs, are enjoyed as a form of companionship. A vast majority of households in the United States include a companion animal. Pets not only provide love and affection, but they are also linked to keeping a pet owner well. Pet ownership is linked to lower blood pressure, reduced stress, and overall health. So, pets make pet owners happier and healthier.

Some pets are taken on travels with their owners which may entail riding in vehicles, on both long and short rides. On long rides, pets need to relieve themselves. Often a vehicle may stop at a rest stop, or other relevant location, to allow a pet to relieve themselves. There are some pets that may not use the outdoors, such as cats, which are commonly used to a litter box. For such situations, pet owners may travel with a litter box that are for use by animals that naturally like to bury their waste or animals that may be trained to use such litter boxes. However, travelling with a litter box can cause its own issues, such as the size of the litter box can use up too much space, the litter can spill with the jostling in the vehicle, and other issues. There are disposable litter boxes that can be used, but that creates an environmental issue where excess waste in the form of the litter boxes is discarded into the waste.

This disclosure provides a novel article that addresses the above issue for a portable litter box.

SUMMARY

This disclosure provides a novel litter box that is portable and collapsible providing ease of traveling with the litter box. The disclosure also provides a litter box which prevents the loss of litter from the box or animal waste within the litter. The disclosure is also directed toward a litter box that can be opened for an animal to use and is an enclosed box. Additionally, the litter box is also collapsible, which can be collapsed after use so minimal space is used when being stored. Further, collapsing the box also prevents litter and associated waste from escaping the litter box.

According to one aspect of this disclosure, an animal litter box is provided. The litter box comprises a bottom tray and a top enclosure. The bottom tray is configured having four upstanding walls for holding litter. The top enclosure is configured with a first side wall, a second side, and a roof that is connected to the first and second side walls. The first and second side walls are also connected to the corresponding side walls on the bottom tray. The bottom tray and the top enclosure form an enclosed space for an animal to use. The litter box also includes a back wall that is hingedly connected to the bottom tray so that the back wall can be folded down over the open the litter tray during storage.

These and other aspects are depicted in the accompanying figures and described below and will be further apparent based thereon.

BRIEF DESCRIPTION OF THE DRAWINGS

Embodiments of this disclosure are described in detail below with reference to the drawings. Features, aspects, and advantages of this disclosure will be better understood with reference to the following description, appended claims, and accompanying drawings. The drawings provided herein are for illustrative purposes only of selected embodiments, and not all possible implementations, and are not intended to limit the scope of this disclosure.

DETAILED DESCRIPTION

Figure 1:
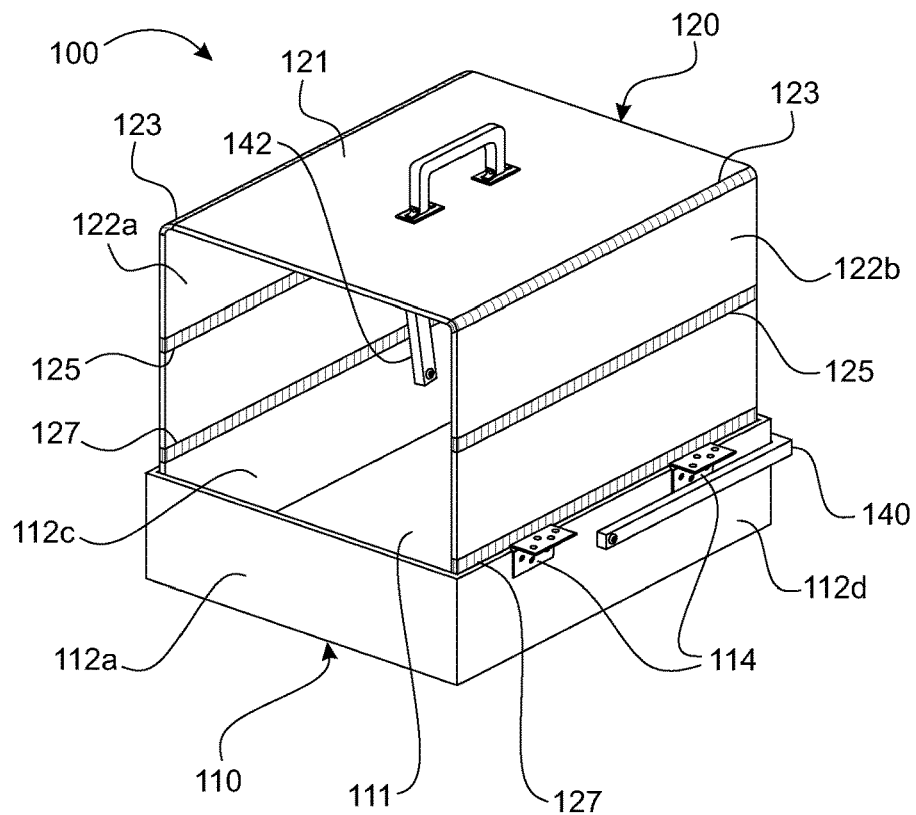
FIG. 1 is a conceptual illustration of a perspective view of a litter box, in accordance with an illustrative embodiment.

In this detailed description, the summary above, the claims below, and the accompanying drawings, reference is made to particular features and aspects (including method steps). It should be understood that this disclosure includes all possible combinations of such features and aspects. For example, where a particular feature is disclosed in the context of a particular embodiment or implementation, or in a particular claim, that feature may also be used, to the extent possible, in combination with and/or in the context of other particular aspects and embodiments of this disclosure.

The term "comprises" and grammatical equivalents thereof are used herein to mean that other features, components, and steps are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps that are carried out before any of the defined steps, between two of the defined steps, or after all of the defined steps (except where the context excludes that possibility).

Certain terminology and derivations thereof may be used in the following description for non-limiting purposes of convenience. For example, terms such as "opposite," "upward," "downward," "left," "right," "middle," "adjacent," and "behind" refer to directions in the drawings to which reference is made unless otherwise stated. Similarly, words such as "inward" and "outward" refer to directions toward and away from, respectively, the geometric center of a device or area and designated parts thereof. References in the singular tense include the plural, and vice versa, unless otherwise noted. Terms such as "attached to," "coupled to," "affixed to," "fastened to," etc. as used herein may refer to a direct or indirect connection.

This disclosure is drawn to an animal litter box which is an enclosed, collapsible, and portable box which can be used when traveling in a vehicle. A top enclosure of the litter box is provided such that it can collapse onto a top of a bottom tray during storage which minimizes the amount of space the litter box takes and prevents litter in the bottom tray from leaking or spilling out.

FIGS. 1 to 8 illustrate a conceptual diagram of a litter box 100. FIG. 1 is a conceptual diagram of the litter box 100, in an extended or fully opened position for use, in accordance with non-limiting embodiments of this disclosure. In the illustrated non-limiting embodiment, the litter box 100 takes a geometric form of a rectangular box in the open position and a collapsed position (see FIG. 5). In this regard, although this disclosure is presented primarily in the context of being used as a litter box to be used by an animal, it should be understood that the litter box 100 as presented may be used in context with other type of storage and carrying boxes.

Figure 2:
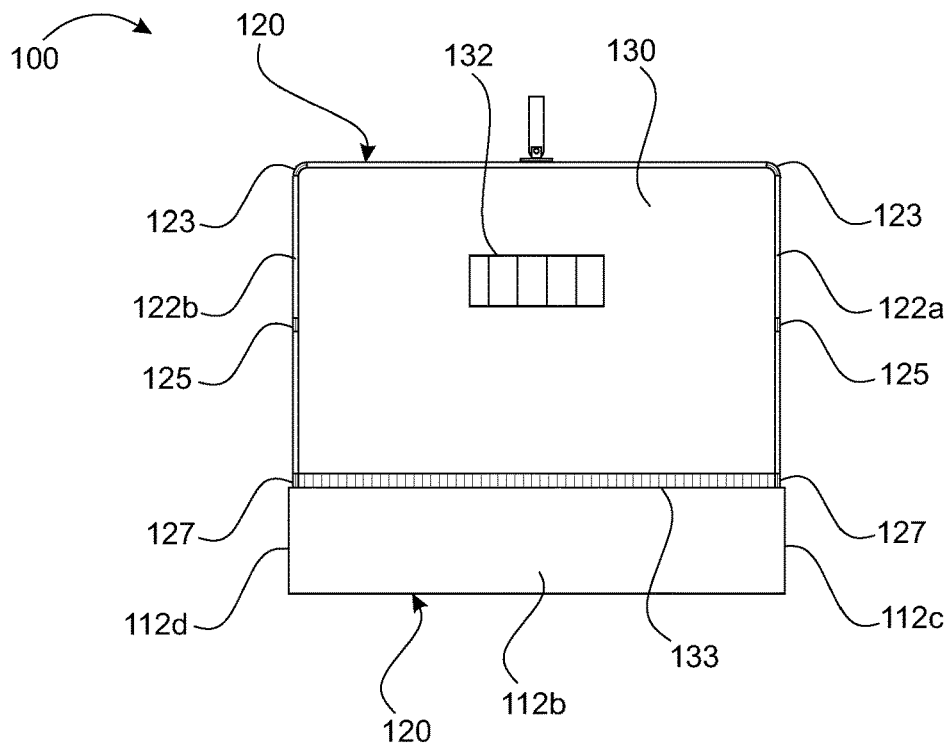
FIG. 2 is a pictorial illustration of a back side of the litter box in accordance with an illustrative embodiment.

As best seen in FIGS. 1 and 2, the litter box 100 comprises of a bottom tray 110, a top enclosure 120, and a rear panel 130. The bottom tray 110 of the litter box 100 is configured for holding litter and includes a base 111 with a front wall 112a, a back wall 112b, a left wall 112c, and a right wall 112d, wherein the walls define a length and a width of the bottom tray 110. The top enclosure 120, as best seen in an extended or open position in FIG. 1, includes a top 121, a left side wall 122a, and a right side wall 122b. The directions "front," "back," "left," and "right" are strictly used in conjunction with the presented view of the illustration in FIG. 1 and not intended to be limiting in any way. The top enclosure 120 may be connected to the bottom tray 110. Additionally, the rear panel 130 may be connected to the bottom tray 110, or alternatively may be connected to the top enclosure 120.

As mentioned above, the top enclosure 120 is connected to the bottom tray 110. Specifically, the left side wall 122a and the right side wall 122b are connected to their respective side walls 112c, 112d on the bottom enclosure 110. Additionally, the top panel 121 has a hinged connection 123 to each of the left side wall 122a and the right side wall 122b. The left side wall 122a and the right side wall 122b are also hingedly connected 127 to the left and right wall 112c, 112d on the bottom tray 110. Each of these hinged connections may have one straight hinge that runs an entire length of the connection, or the hinged connections may include one or more hinges interspersed along a length of the connection. Additionally, the left side wall 122a and the right side wall 122b each have a one or more hinges 125 along their lengths at a relative centerline that separates each of the left and right side walls 122a, 122b into two relatively equal sections.

Figure 4:
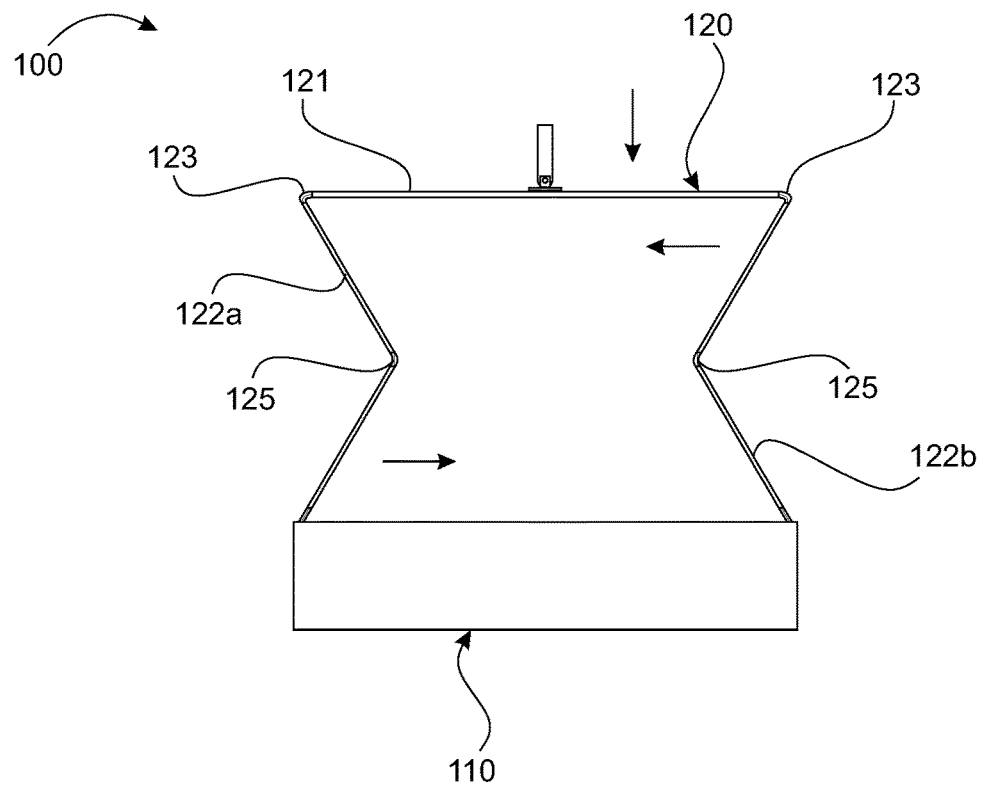
FIG. 4 is a pictorial illustration of a front view of the litter box showing the litter box being manipulated into a collapsed position, in accordance with an illustrative embodiment.
Figure 5:
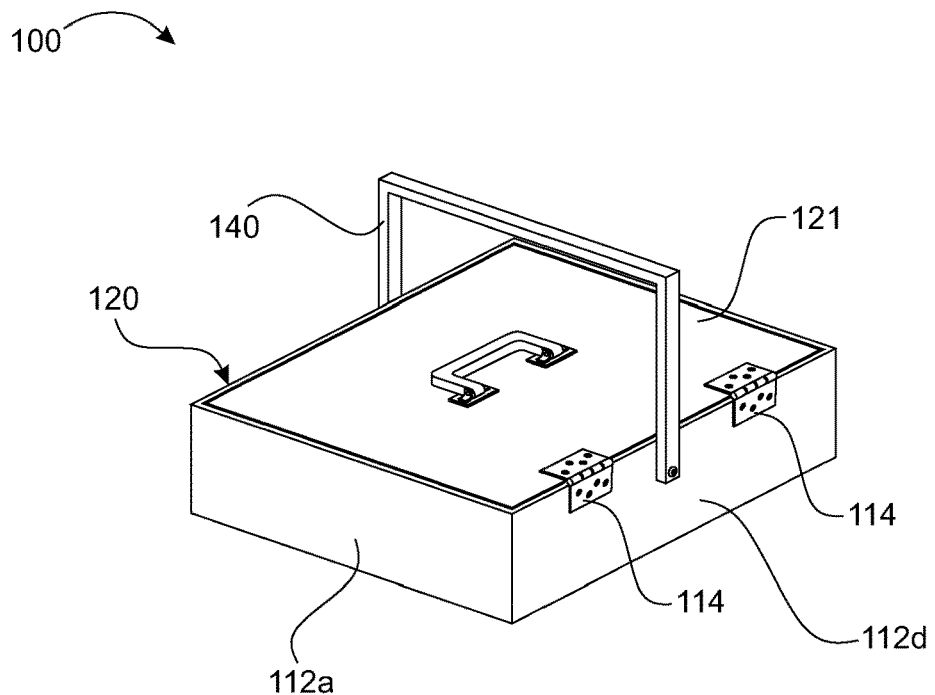
FIG. 5 is a pictorial illustration of the litter box in a collapsed position, in accordance with an illustrative embodiment.

As seen in FIG. 4, the hinged connections 123, 125, 127 allow the top enclosure 120 to fold down on to a top of the bottom tray 110. The tops enclosure 120 will fold at the hinged connections 123, 125, 127 such that the left and right walls 122a, 122b will fold inward toward each other with the top panel 121 resting on top of the folded left and tight walls 122a, 122b. FIG. 5 illustrates the litter box 100 in a collapsed position wherein the top enclosure 120 has been collapsed, or folded down, onto the bottom tray 110 such that only the top panel 121 of the top enclosure 120 is presented. As seen in FIGS. 1 and 5, the litter box also comprises one or more clips 114 which may be used to hold the top enclosure 120 in the collapsed position over the bottom tray 110. As seen in the illustrations, the one or more clips 114 are included on the bottom tray and may be hingedly connected such that the one or more clips 114 can be moved onto the top panel 121 when the top enclosure 120 is folded downward onto the bottom tray 110. As shown, the one or more clips 114 are included on the right side wall 112d of the bottom tray 110. It is to be understood that the one or more clips 114 may be included on the left side wall 112c, or on both left and right side walls 112c, 112d. It is also to be understood that other mechanisms or features that can hold the top enclosure 120 in the collapsed position are also within the disclosure of this invention.

Figure 3:
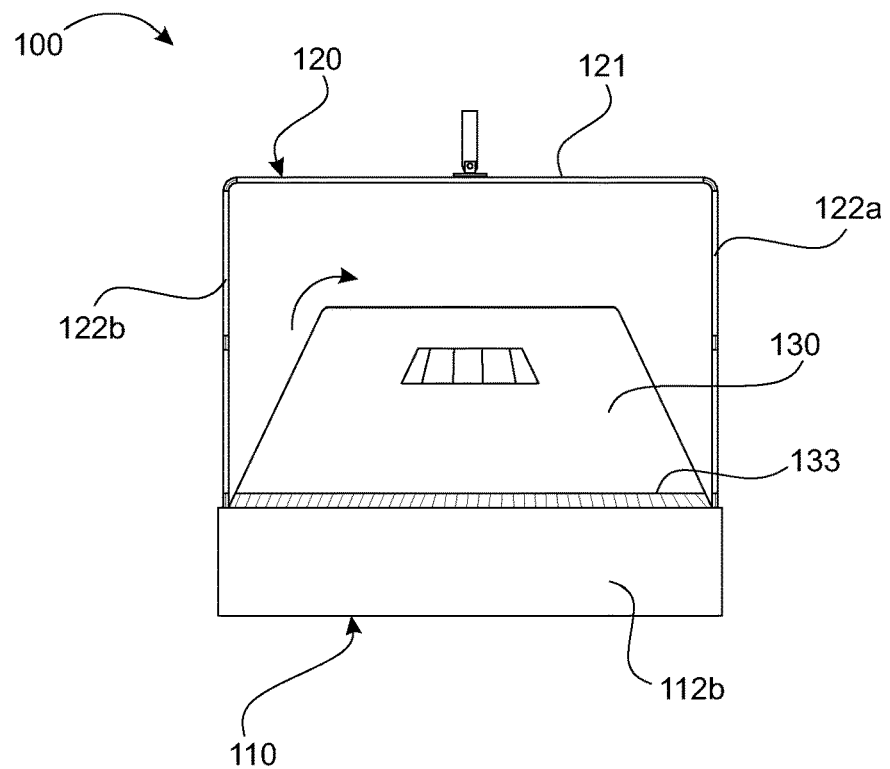
FIG. 3 is a pictorial illustration of back side of the litter box showing a back wall in a lowered position, in accordance with an illustrative embodiment.

FIGS. 2 and 3 illustrate a rear view of the litter box 100. The rear wall 130 is shown to be hingedly connected 133 to the back wall 112b on the bottom tray 110. The hinged connection 133 is provided to position the rear panel 130 either extending upward in line with the back wall 112b or pressed inward over the top of the bottom tray 110. In use, the rear panel 130 is extending upward to present an animal with an uncovered bottom tray 110 for use. A user may press the rear panel 130 at the hinged connection 133 (see, FIG. 3) to allow for the movement of the top enclosure 120 downward into the collapsed position. As seen in FIG. 2, the rear panel 130 also includes a vent 132 which may provide for additional ventilation.

As shown in FIG. 1, it will be readily appreciated that a front of the litter box 100 is open and is provided as an entryway 102 when the litter box 100 is in the fully opened position. The entry way 102 defines an entry for an animal to enter into the litter box 100. Along with the vent 132 in the rear panel 130, proper ventilation is also provided with a crossflow of air.

The litter box 100 further includes a carrying handle 140 which is provided connected to both the left and right side walls 112c, 112d. As best seen in FIGS. 1 and 5 to 8, the carrying handle includes a latch 142 which is provided on an inside of the litter box. The carrying handle 140 and the latch 142 are perpendicular to each other and are connected to each other such that as the handle 140 is moved about a hinge at the left and right walls 112c, 112d, the latch will move respectively while remaining perpendicular to the carrying handle 140. The latch 142 in its configuration and attachment to the carrying handle 142 allows the top enclosure 120 to be opened or collapsed. It will be appreciated that the latch 142 is positioned on each of the left and right side walls 112c, 112d and is also positioned such that when the latch 142 is in the upright position (wherein the carrying handle is parallel to the length of the bottom tray 110), the latch 142 is abutting against the left side wall 122a and right side wall 122b of the top enclosure 120. The concurrent movement of the carrying handle 140 and the latch 142 will be readily understood and will be explained below for better understanding.

Figure 6:
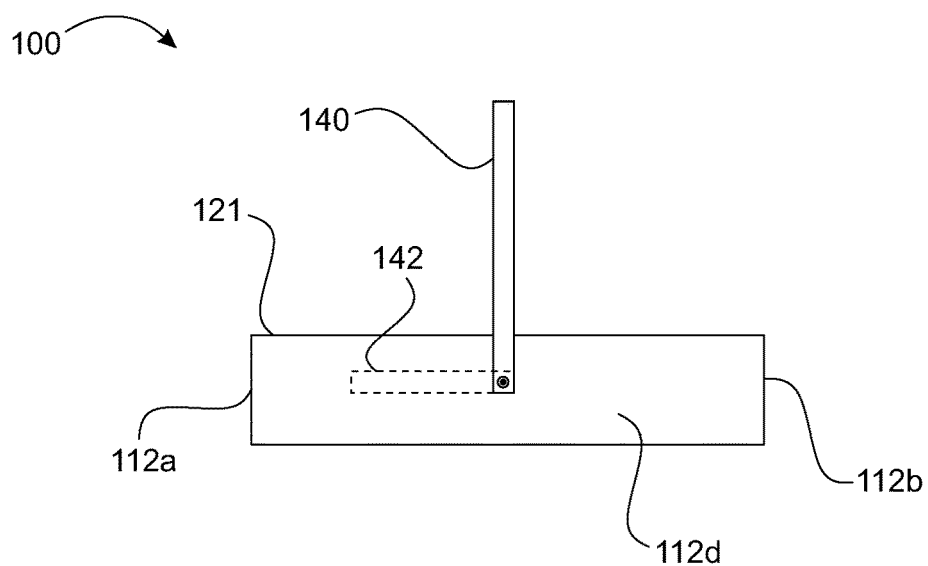
FIG. 6 is a pictorial illustration of an internal side view of the litter box in a collapsed position showing a rod on an inside connected to a carrying handle which is on an exterior of the litter box, in accordance with an illustrative embodiment.
Figure 7:
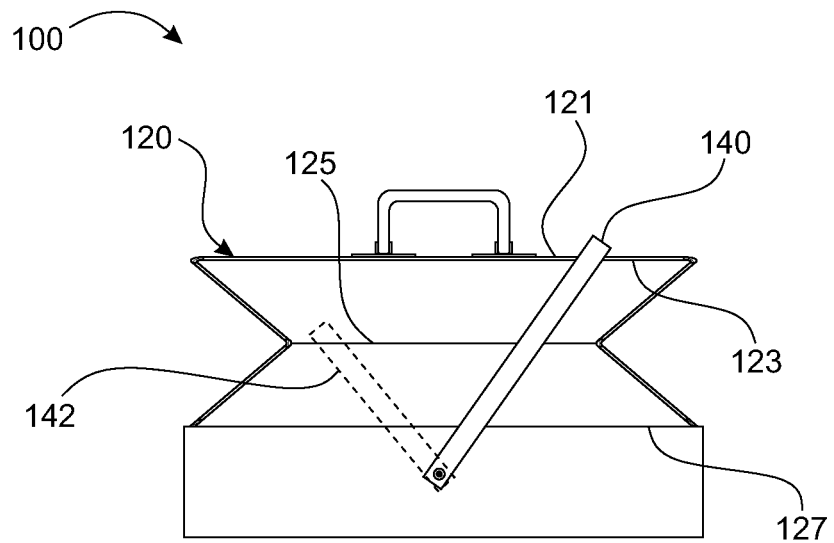
FIG. 7 is a pictorial illustration of the internal side view of the litter box from FIG. 6 showing the rod opening the top enclosure while the carrying handle is lowered, in accordance with an illustrative embodiment.
Figure 8:
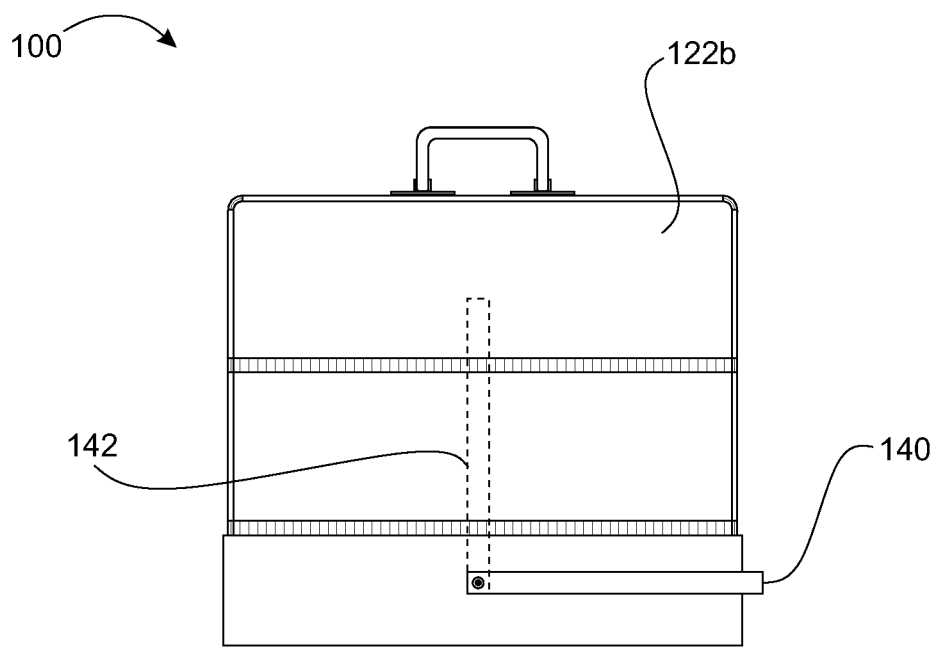
FIG. 8 is a pictorial illustration of the internal side view of the litter box from FIG. 6 showing the top enclosure fully opened with the rod in accordance with an illustrative embodiment.

FIGS. 6 to 8 illustrate the litter box 100 with the carrying handle 140 in the various positions with the concurrent movement of the latch 142 illustrated on the interior of the litter box 100. As seen in FIG. 6, the carrying handle 140 is positioned upright to allow the litter box 100 to be carried and the latch 142 is positioned parallel along each of the left and right walls 112c, 112d of the bottom tray 110. In FIG. 7, the carrying handle 140 is partly lowered with the respective movement of the latch 142 upward. As the carrying handle 140 is lowered, the latch 142 moves upward pushing against the top panel 121 to move the top enclosure 120 upward toward the open position. In FIG. 8, the carrying handle 140 is fully lowered and parallel with the bottom tray 110 with the latch 142 concurrently moving into the upright position, which is perpendicular with the length of the bottom tray. In this position, the top enclosure 120 is fully open with the latch 142 resting against the left side wall 122a and the right side 122b and preventing the top enclosure from moving down into the collapsed position. The top enclosure 120 can be readily moved into the collapsed position by lifting the carrying handle 140 which concurrently moves the latch 142. The top panel 121 can be pressed downward to collapse the top enclosure 120 onto the bottom tray 110.

The corresponding structures, materials, acts, and equivalents of all means or step plus function elements in the claims below are intended to include any structure, material, or act for performing the function in combination with other claimed elements as specifically claimed. This description is presented for purposes of illustration and is not intended to be exhaustive or limited to the form disclosed. Many modifications and variations will be apparent to those of ordinary skill in the art without departing from the scope and spirit of the appended claims.

What is claimed is:

1. A collapsible animal litter box comprising:
   a bottom tray having four upstanding walls, an open top, and a closed bottom;
   a top enclosure comprising a first side wall, a second side wall, and a roof, said roof hingedly connected to the first and second side walls;
   said first and second walls being hingedly connected to the bottom tray;
   said first and second walls further comprising hinges that are aligned horizontally in center of the first and second walls;
   a back wall comprising a top and a bottom, said bottom being hingedly connected to the upstanding walls of the bottom tray;
   collapsible animal litter box further comprising a handle and a latch;
   said handle being located outside the four upstanding walls of the bottom tray;
   said latch being located within the four upstanding walls of the bottom tray;
   said handle being connected to said latch at a perpendicular angle;
   said handle and latch being rotatably connected to the bottom tray;
   whereby when the handle is positioned parallel to the closed bottom of the bottom tray, the latch will push upward on the roof of the top enclosure;
   whereby when the handle is positioned perpendicular to the closed bottom of the bottom tray, the latch will push recede into the bottom tray, allowing the top enclosure to collapse;
   whereby the collapsible animal litter box is opened by positioning the handle perpendicular to the closed bottom of the bottom tray and erecting the first and second walls into an upright position and positioning the back wall so that the roof rests on the top of the back wall;
   whereby the collapsible animal litter box is stored by positioning the handle perpendicular to the closed bottom of the bottom tray and folding the first and second walls inward with the roof resting on top of the folded first and second walls and folding down the back wall.

2. A collapsible animal litter box comprising:
   a bottom tray having four upstanding walls, an open top, and a closed bottom;
   a top enclosure comprising a first side wall, a second side wall, and a roof, said roof hingedly connected to the first and second side walls;
   said first and second walls being hingedly connected to the bottom tray;
   said first and second walls further comprising hinges that are aligned horizontally in center of the first and second walls;
   the collapsible animal litter box further comprising a handle and a latch;
   said handle being located outside the four upstanding walls of the bottom tray;
   said latch being located within the four upstanding walls of the bottom tray;
   said handle being connected to said latch at a perpendicular angle;
   said handle and latch being rotatably connected to the bottom tray;
   whereby when the handle is positioned parallel to the closed bottom of the bottom tray, the latch will push upward on the roof of the top enclosure;
   whereby when the handle is positioned perpendicular to the closed bottom of the bottom tray, the latch will push recede into the bottom tray, allowing the top enclosure to collapse;
   whereby the collapsible animal litter box is opened by using the handle to push upward on the roof of the top enclosure and erecting the first and second walls into an upright position;
   whereby the collapsible animal litter box is stored by positioning the handle perpendicular to the closed bottom of the bottom tray and folding the first and second walls inward with the roof resting on top of the folded first and second walls.

* * * * *